US006493168B1

(12) United States Patent
French et al.

(10) Patent No.: US 6,493,168 B1
(45) Date of Patent: *Dec. 10, 2002

(54) METHOD FOR CLEANING A SLIDER IN A DISK DRIVE

(75) Inventors: Jim French, Lafayette, CO (US); Mike McNeil, Nederland, CO (US); Ross Chessman, Erie, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/991,663

(22) Filed: Dec. 16, 1997

Related U.S. Application Data

(63) Continuation-in-part of application No. 08/715,539, filed on Sep. 18, 1996, now Pat. No. 5,850,321.

(51) Int. Cl.[7] .......................... G11B 15/46; G11B 21/02
(52) U.S. Cl. .................... 360/73.03; 360/75; 360/237.1
(58) Field of Search .......................... 360/128, 105, 360/69, 73.01, 73.03, 74.1, 75, 78.01, 78.04, 122, 106, 234.3, 235.4, 236.8, 237.1

(56) References Cited

U.S. PATENT DOCUMENTS

| 3,638,089 A | 1/1972 | Gabor ........................ 360/69 X |
| 4,384,311 A | 5/1983 | McNeil ........................ 360/128 |
| 4,490,766 A | 12/1984 | Hill et al. .................... 360/137 |
| 4,510,541 A | 4/1985 | Sasamoto ..................... 360/97 |
| 4,594,617 A * | 6/1986 | Tezuka .................... 360/128 X |
| 5,119,250 A * | 6/1992 | Green et al. ............. 360/78.06 |
| 5,307,489 A * | 4/1994 | Yamazaki .................. 360/75 X |
| 5,351,156 A | 9/1994 | Gregory et al. ............ 360/74.1 |
| 5,424,884 A * | 6/1995 | Nonaka ....................... 360/128 |
| 5,535,073 A | 7/1996 | Brezoczky et al. ......... 360/105 |
| 5,612,830 A * | 3/1997 | Gregory et al. ............. 360/128 |
| 5,696,643 A | 12/1997 | Tsuwako et al. ......... 360/73.03 |
| 5,793,553 A * | 8/1998 | Smith ........................ 360/74.1 |
| 5,850,321 A * | 12/1998 | McNeil et al. .............. 360/106 |
| 5,863,237 A | 1/1999 | Felts et al. ........... 360/73.03 X |
| 6,049,439 A | 4/2000 | Ono et al. ........... 360/73.03 X |
| 6,084,743 A | 7/2000 | Gillis et al. ................. 360/128 |

FOREIGN PATENT DOCUMENTS

JP    405054347 A    3/1993    ................. 360/75

* cited by examiner

Primary Examiner—Andrew L. Sniezek
(74) Attorney, Agent, or Firm—David M. Sigmond

(57) ABSTRACT

The present invention is directed to a disk drive that employs a proximity recording interface in which a slider that carries a head is designed to remain in contact with the disk during data transfer operations to achieve a high data density. In particular, the present invention is directed to cleaning debris from a pad on the slider that carries the head. The debris, if allowed to accumulate, can reach a depth at which the head is spaced from the disk at a distance which adversely affects the transfer of data with the disk. In one embodiment, the spin motor of the disk drive is caused to rotate at a lower angular velocity than during normal data transfer operations, preferably using open loop control, while the actuator of the disk drive is used to radially displace the slider and associated head, also preferably using open loop control. For a constant angular velocity of the disk, the change in radial position causes different areas of the pad to be contacted and cleaned by the disk. Additionally, the disk is cleaned of debris that could also affect the ability to transfer data with the disk. Further, the lubricant on the disk surface that facilitates the proximity recording interface and may have migrated is redistributed.

70 Claims, 7 Drawing Sheets

METHOD FOR CLEANING A SLIDER IN A DISK DRIVE

CROSS-REFERENCE TO RELATED APPLICATIONS

The present invention is a continuation-in-part of Ser. No. 08/715,539 of McNeil and Chessman for "SELF-CLEANING PROXIMITY RECORDING INTERFACE", filed Sep. 18, 1996 (U.S. Pat. No. 5,850,321), incorporated herein by reference.

FIELD OF THE INVENTION

The present invention is directed to disk drives that employ a proximity recording interface in which the structure that supports the head contacts the disk during data transfer operations rather than flying above the disk during such operations. In particular, the present invention is directed to the cleaning of the structure that supports the head so as to prevent the head from becoming spaced from the disk to an extent that inhibits data transfer operations.

BACKGROUND OF THE INVENTION

A disk drive is comprised of a magnetic disk that includes a plurality of concentric tracks for storing user data. A spin motor is employed in the drive to rotate the disk at a defined angular velocity so that data can be transferred between the disk and a magnetic/electrical transducer, which is typically referred to as a head. The head is a transducer that, when data is being written on the disk, converts an electrical signal representative of the data into a magnetic signal that is imprinted on the disk. Conversely, when data is being read from the disk, the head senses the magnetic signal representative of the data previously written on the disk and converts this magnetic signal into an electrical signal. Typically, the head is used to perform both read and write operations. However, certain disk drives employ separate heads for reading and writing data. The head is housed in a structure that is typically referred to as a slider. An actuator assembly serves to position the slider and head at specified locations over the disk. In the case of data transfers, the actuator assembly positions the head over a specified track on the disk. The actuator assembly is comprised of an actuator arm which has one end attached to the slider by a gimble-like connection and the other end attached to a motor that moves the arm to position the head at the desired location over the disk. Typically, the motor is a voice coil motor (VCM) that rotates the arm to radially position the head over a desired location on the disk.

For many years, the sliders and actuator arms of disk drives were designed to make use of the wind created by the spinning disk to fly the head above the disk and thereby avoid contact between the slider and the disk that could damage the disk and potentially result in the loss of data contained on the disk. The drawback of flying the head over the disk is that as the distance between the head and the disk increases, the amount of data that can be established on a given area of the disk decreases, i.e., the data density of the disk is reduced. Consequently, significant effort was expended in reducing the flying height of the head over the disk and thereby increasing the data density of the disk. However, as the flying height of the head was decreased, the ability to read and write data became increasingly affected by small particles on the disk surface. Specifically, when a low flying slider was contacted by one of the small particles on the disk, the particle, in many instances, caused the slider to jump away from the disk to a level at which read and/or write operations were adversely affected. Further, if there was enough energy in the collision, the resulting thermal effects would cause a crash that would destroy data and in some cases the head itself Consequently, various techniques were developed to remove debris from the disk to prevent such events from occurring.

Contrary to the popular belief that contact between the slider and the disk was to be avoided, a disk drive with a proximity recording interface was developed in which the slider contacts the disk during data transfer operations to position the head extremely close to the disk and thereby realize an increase in data density over disk drives that employ flying heads. With the slider in contact with the disk, cleaning of the disk is less of a concern because the slider tends to sweep particles out of the way as it moves over the disk surface during normal operations. However, due to the contact between the slider and the disk, the slider can accumulate debris that, as the debris accumulates, increases the spacing between the head and the disk. If the debris is allowed to accumulate unabated, the spacing between the head and the disk can reach a point at which data transfer operations are adversely affected. Moreover, because the debris is largely comprised of the lubricant forming the top layer of the disk, it can be thermally polymerized in certain situations to form a varnish-like material that is extremely difficult to remove and if of sufficient depth, can adversely affect the ability to do data transfer operations to an extent that the disk drive is essentially considered to be inoperable.

Based on the foregoing, there is a need for a disk drive with a proximity recording interface that is capable of cleaning the slider to avoid the accumulation of debris that could cause the head to be spaced a distance from the disk at which data transfer operations would be adversely affected and to prevent such debris from transforming into the noted varnish-like film that can render the drive virtually inoperable.

SUMMARY OF THE INVENTION

An object of the present invention is to provide a disk drive with a proximity recording interface that is capable of cleaning the slider portion of the interface to prevent debris from accumulating on the slider to a point at which the head is spaced from the disk at a distance that adversely affects data transfer operations.

It is a further object of the invention to provide a disk drive with a proximity recording interface that is capable of cleaning the slider portion of the interface to prevent the accumulation of debris on the slider that can form a varnish-like film that if allowed to accumulate can render the disk drive inoperable.

It is another object of the invention to provide a disk drive with a proximity recording interface that is capable of both cleaning the slider portion of the interface as well as redistributing the lubricant that forms the top layer of the disk, which has a tendency to migrate from the inner portion of the disk towards the outer portion of the disk due to the spinning of the disk.

It is yet another object of the invention to provide a disk drive with a proximity recording interface that both cleans the slider portion of the interface and also cleans debris residing of the surface of the disk that contributes to the accumulation of debris on the slider.

In one embodiment of the invention, a disk drive is provided that includes a spin motor for rotating a disk that can be either non-removable or removable by the user during normal operation of the disk drive, a head, a slider for housing the head, and an actuator assembly for moving the slider and head to desired positions over the disk. The slider includes a pad that houses the head and is defined by a leading edge, a trailing edge, and a curved or crowned surface that faces the disk and extends between the leading and trailing edges. Also included in the disk drive is a device for removing debris that may have accumulated on the pad during use of the disk drive.

In one embodiment, the noted device for removing debris causes the spin motor to rotate the disk at a lower angular velocity than during normal data transfer operations and further causes the actuator assembly to radially displace the slider and head. Low angular velocity spinning of the disk can be achieved using an open loop control for the spin drive motor. These operations cause the slider to rotate relative to the disk surface such that various portions of the curved surface of the pad are cleaned by the disk. Further, the disk is swept of debris to the extent of the radial displacement of the slider.

In a further embodiment, the noted device for removing debris causes the actuator assembly to displace the slider between the inner and outer radiuses of the disk, i.e., the range of radiuses on the disk over which the actuator assembly can position the slider. This serves to clean at least a portion of the pad and all of the disk over which the actuator assembly can position the slider. An open loop control can be used to achieve displacement of the slider, preferably after verifying that the disk is spinning.

In another embodiment, the noted device for removing debris causes the actuator assembly to radially displace the slider from an outer radial position to an inner radial position to clean at least a portion of the pad, sweep the disk over the area of radial displacement, and to redistribute the lubricant that has migrated towards the outer diameter of the disk due to the spinning of the disk.

In another embodiment, the device for removing debris causes the actuator assembly to radially displace the slider in both inward and outward radial directions relative to the disk. This serves to clean at least a portion of the pad, cleans the disk over the extent over which the slider is radially displaced, and to the extent the inward radial displacement and outward radial displacements overlap, evenly distributes the lubricant in this overlap region.

In yet a further embodiment of the invention, the device for removing debris is adapted to operate at times which the rotational velocity of the spin motor is increasing, such as when the disk drive is transitioning from a cold, start-up state to an operational state for data transfers, and when the disk drive is transitioning from an energy saving state in which the rotational velocity of the spin motor has been reduced to save power to a state at which the rotational velocity of the spin motor has increased, such as the noted operational state.

In a further embodiment, the device for removing debris is adapted to operate at times when the rotational velocity of the spin motor is decreasing, such as going from an operational state to a cold, start-up state or an energy saving state.

A further embodiment of the invention employs a device for removing debris that is adapted to operate at times when the pad is expected to have accumulated debris. For instance these times can be periodic during, for example, extended operation of the disk drive. In another situation, these times can be based upon the prior use of the disk drive apparatus. For example, the previously noted varnish-like film is believed to form when the pad is positioned over one or several closely positioned tracks for an extended period of time such that heat is produced which polymerizes any lubricant on the pad into the varnish-like film. In such a situation, the device for removing debris can be adapted to sense this situation and then operate at times or intervals to prevent the formation of the varnish-like film.

Another embodiment of the invention employs a device for removing debris that operates as part of an error recovery operation. More specifically, during a read or write operation, an error in transferring the data between the disk and the head may be detected. As part of an operation to correct the error, the device for removing debris is used to remove debris from the proximity recording interface before the failed data transfer operation is retried.

DETAILED DESCRIPTION OF THE PREFERRED EMBODIMENT

Figure 1:
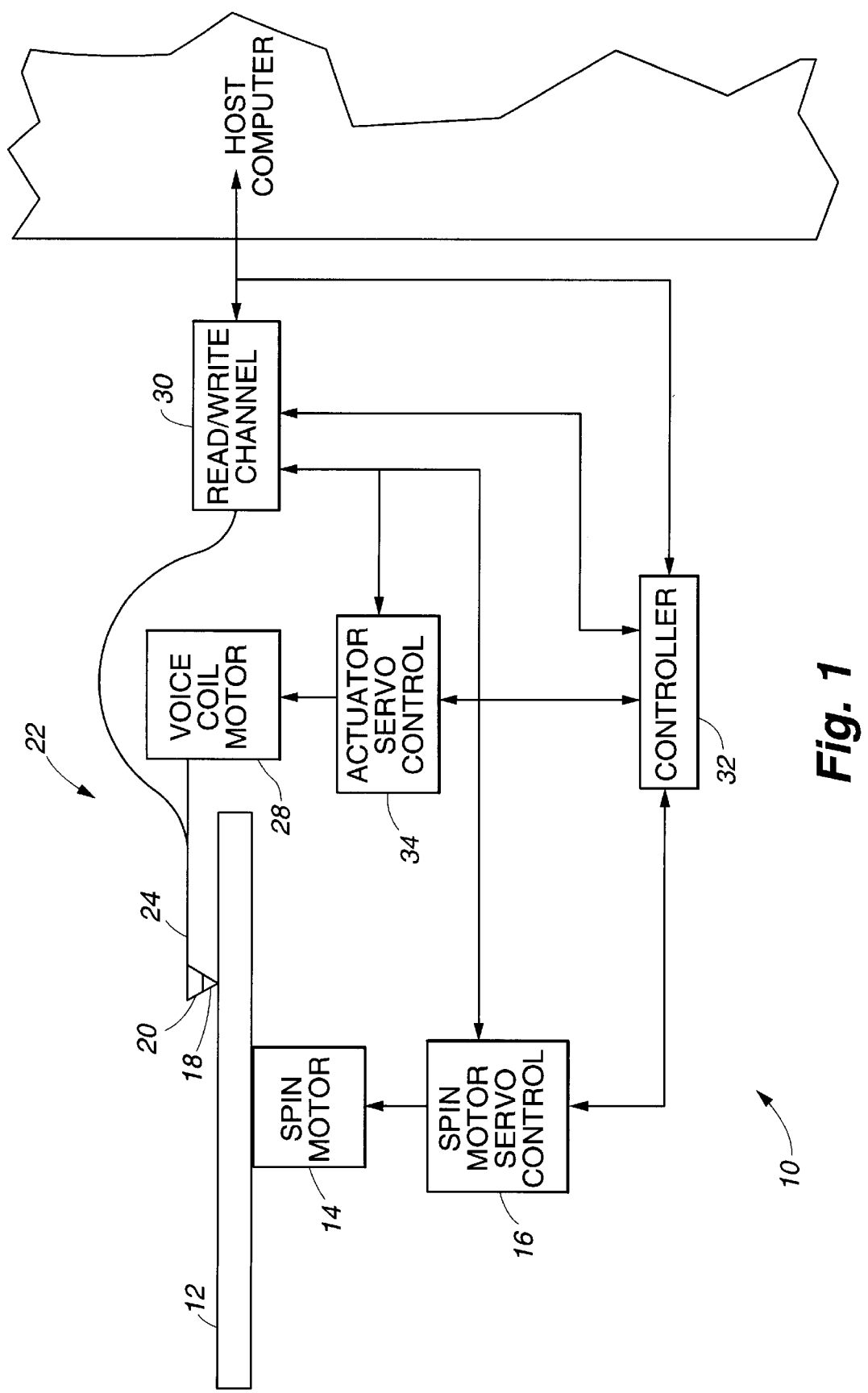
FIG. 1 is a generalized block diagram of a magnetic disk drive with a proximity recording interface.

FIG. 1 is a block diagram of a disk drive with a self-cleaning proximity recording interface, hereinafter referred to as disk drive 10. The proximity recording interface is an interface in which a slider, which houses a head, contacts the disk surface during data transfer operations rather than flying above the disk surface during data transfer operations.

At this point it should be appreciated that the invention is applicable to disk drives in which the disk for storing user data is a permanent component of the disk drive and to disk drives that permit the user to remove the disk or disks from the drive. For purposes of the following description, however, the disk or disks will be described as permanent components of the drive.

The disk drive 10 includes a disk 12 for storing user data. The disk 12 includes magnetic recording media that has a plurality of concentric tracks for storing user data. The recording media further includes servo data for use in maintaining the angular velocity of the disk 12 necessary for data transfer operations, keeping the head over a specified track during a data transfer operation, and for moving the head from one track to another track for a data transfer operation. The servo data can be interspersed with the user data in what is termed an embedded servo system. In one embodiment of an embedded servo, a track is divided into sectors with each sector containing a servo section that contains servo data. In some cases the servo data includes sector identifying data. In other cases, sector identifying data is omitted from a number of sectors on a track to realize what is termed an id-less drive. Alternatively, the servo data can be located on a separate surface of the disk in what is termed a dedicated servo system. For example, the servo data could be located on the lower surface of the disk and the user data could be located on the upper surface of the disk. In such a case, a separate head is required to access the servo data. The disk further includes a lubricant that is disposed over the recording media and facilitates movement of a slider that houses the head over the recording media during data transfer operations.

The disk drive 10 further includes a spin motor 14 for rotating the disk 12 at a specified angular velocity that is appropriate for the state of the disk drive 10. For example, the spin motor may rotate the disk at a first angular velocity for data transfer operations but rotate the disk at a second, lower angular velocity if the disk drive is in an energy saving state.

Also included in the disk drive 10 is a spin motor servo control 16 that uses the servo data read from the disk 12 to control the angular velocity at which the spin motor 14 rotates the disk 12.

A read/write head 18 employed in the disk drive 10 for reading user and servo data stored on the disk and for writing user and possibly servo data on the disk. It should be appreciated, however, that the invention is also applicable to disk drives that employ separate read and write heads, as well as disk drives that utilize only a read head or only a write head.

To house the read/write head 18, a slider 20 is employed. The slider 20 implements the proximity recording interface by housing the read/write head 18 near its trailing edge and functioning, when the disk 12 is rotating at the angular velocity appropriate for data transfer operations, so that substantially only the trailing edge contacts the disk 12. As a consequence, the read/write head 18 is positioned extremely close to the disk. This, in turn, permits higher data densities to be achieved than in disk drives in which the slider and read/write head fly above the disk surface. Further, the force exerted by the slider 20 on the disk 12 in the proximity design is extremely small, i.e., in the range of 0–600 mg (typically about 300 mg), or typically 10% of the load being borne by the air bearing structure. As a consequence, thermally induced crashes, a common consequence of earlier designs in which the slider flies above the disk, are avoided. In the earlier designs, the contact force between the slider and the disk at low angular velocities is a large fraction or virtually 100% of the load force that the air bearing structure was designed to bear; hence, the air bearing was designed to fly the slider to eliminate the contact force between the slider and the disk and thereby avoid crashes.

An actuator assembly 22 is included in the disk drive 10 for radially positioning the read/write head 18 and slider 20 at a selected location over the disk 12. The range over which the actuator assembly 22 can position the read/write head 18 and slider 20 extends from an inner radius of the disk 12 to a greater, outer radius of the disk 12. The actuator assembly 22 is comprised of an actuator arm 24. One end of the actuator arm 24 is connected to the slider 20 by a gimble-like structure 26 (see FIGS. 3A and 3B) that permits the slider to rotate, as described in greater detail hereinafter, when the disk 12 is spinning. The other end of the actuator arm 24 is operatively connected to a voice coil motor 28 that functions to rotate the actuator arm 24 and thereby position the read/write head 18 and slider 20 at selected radial locations over the disk 12. It should be appreciated that the invention is equally applicable to disk drives that, rather than rotating an actuator arm, linearly displace the actuator arm.

An actuator servo control 34 is employed in the disk drive 10 to use servo data read from the disk 12 to control the voice coil motor 28 so as to maintain the read/write head 18 at a specified radial location over the disk 12 or to move the read/write head 18 between two radial locations within the range of movement provided by the actuator assembly 22.

A read/write channel 30 is included in the disk drive 10 to perform a number of functions relating to user data transfer operations and to servo operations. In the case of a write operation, the read/write channel 30 processes user data provided by a host computer to place it in a form suitable for recording on the disk 12. For example, the read/write channel 30 can encode user data so that errors can be detected when the user data is subsequently read from the disk 12. In the case of read operations, the read/write channel can process the user data read from the disk to place it in a suitable form for the host computer. Further, if the user data was written on the disk 12 with error correction coding, the read/write channel 30 can detect errors in the user data read from the disk 12. These errors, if not too severe, can be corrected by the read/write channel. If, on the other hand, the errors are not correctable, the read/write channel 30 can initiate remedial operations in an attempt to correct the source of the error and then cause the data transfer operation to be retried. A further function of the read/write channel 30 is to separate, in the case of an embedded servo system, the user data from the servo data and then provide the servo data to the spin motor servo control 16 and the actuator servo control 34.

A controller 32 is included in the disk drive 10 to process commands from the host computer and, in so doing, interfaces with the spin motor servo control 16, actuator servo control 34 and read/write channel 30. The controller 32 may also function autonomously in a number of respects and, in so doing, interface with the spin motor servo control 16, actuator servo control 34 and read/write channel 30. For example, the controller 32 may be capable of monitoring the level of energy consumption by the disk drive 10 and if the level is inappropriate for the current use of the disk drive 10, place the disk drive 10 in an energy saving mode that involves commanding the spin motor servo control 16 to reduce the angular velocity of the spin motor 14 and thereby reduce energy consumption.

Figure 2A:
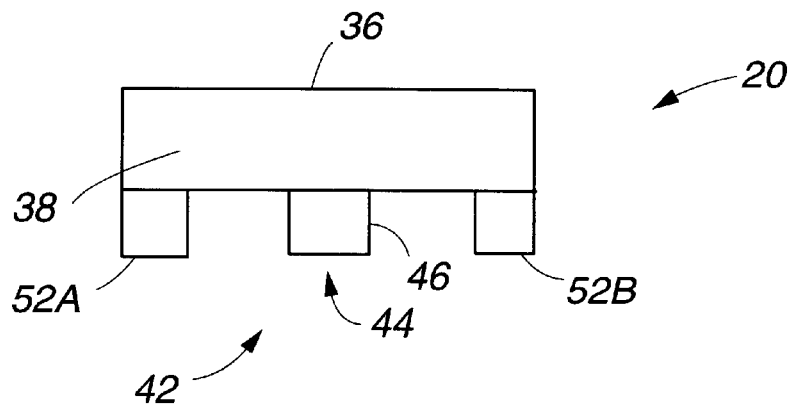
FIGS. 2A–2C are front, side and bottom views of a slider that is used in a proximity recording interface disk drive.
Figure 2B:
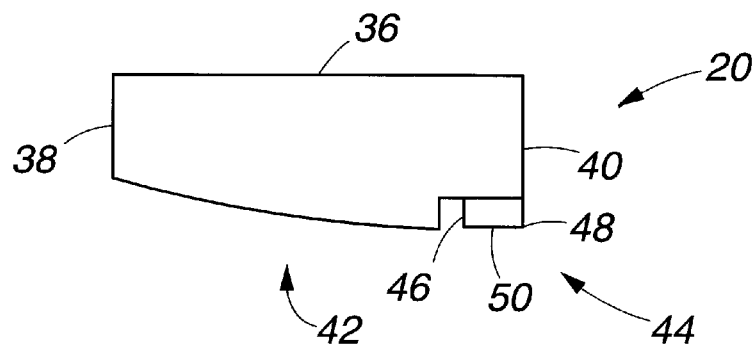
Figure 2C:
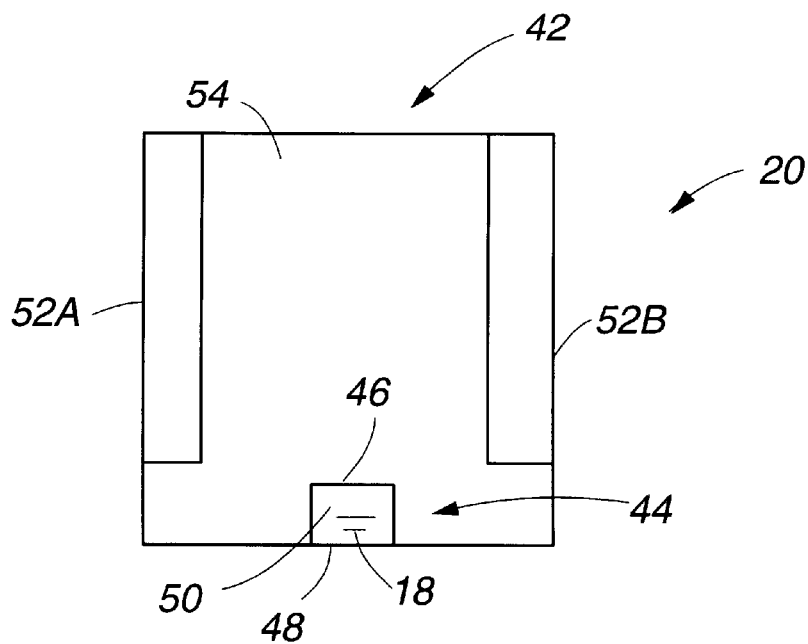

With reference to FIGS. 2A–2C, the slider 20 that is used to implement the proximity recording interface is discussed in greater detail. Specifically, the slider 20 includes a top surface 36 that is connected to the actuator arm 24 via the gimble-like structure 26, a leading face 38, and a trailing face 40 under which a specified location on the disk 12 passes after passing under the leading face 38 during normal data transfer operations. The slider also includes a bottom surface 42 that serves to house the read/write head 18 near the trailing face 40 and also to provide an air-bearing structure that is designed to position the slider 20 so that the portion of the bottom surface 42 near the trailing face 40 is substantially the only portion of the slider 20 in contact with the disk 12 during data transfer operations. To house the read/write head 18, a pad 44 is employed that includes a pad leading edge 46, a pad trailing edge 48, and a pad disk surface extending between the pad leading edge 46 and the pad trailing edge 48. The read/write head 18 is located adjacent to the pad trailing edge 48 and the pad disk surface 50. To provide the noted air bearing, the bottom surface 42 includes first and second rails 52A, 52B that cooperate with a flat portion 54 of the bottom surface 42 to provide an air bearing when the disk 12 is rotating. The air bearing serves to rotate the leading face 38 away from the disk 12 while keeping the trailing face 40 substantially adjacent to the disk 12. An important characteristic of the bottom surface 42 is that the portions of the bottom surface 42 that come into contact with the disk 12 are curved or crowned. Specifically, the pad disk surface 50 and portions of the first and second rails 52A, 52B that contact the disk are all crowned or curved surfaces.

At this point, it should be appreciated that the invention is not restricted to the slider 20 described hereinabove. It is believed that a number of slider structures are possible for use in a proximity recording interface. However, it is believed that characteristic of each slider suitable for a proximity recording interface will be the positioning of the read/write head on the bottom surface adjacent to the trailing face of the slider, an air bearing structure that functions when the disk is spinning at the rotational velocity suitable for data transfer operations so that substantially only the bottom portion of the slider adjacent to the trailing face of the slider is in contact with the disk, and the portions of the bottom surface of the slider that come into contact with the disk are curved or crowned.

Figure 3A:
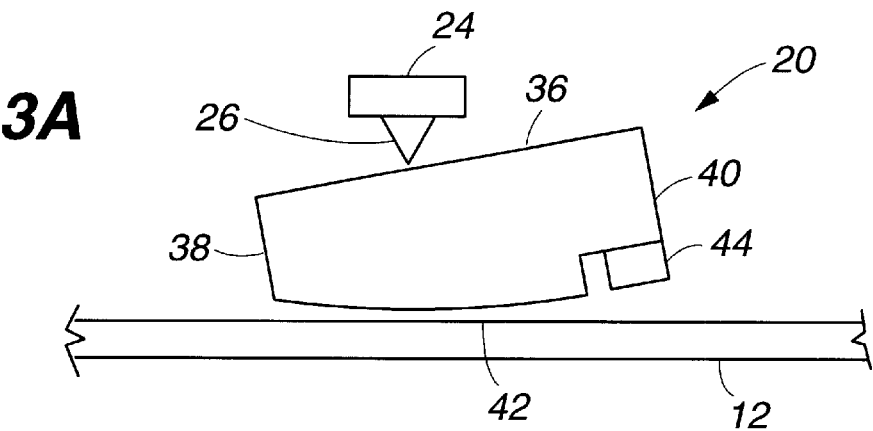
FIG. 3A illustrates the positional relationship between the slider shown in FIGS. 2A–2C to the disk at a time when the disk is not rotating.
Figure 3B:
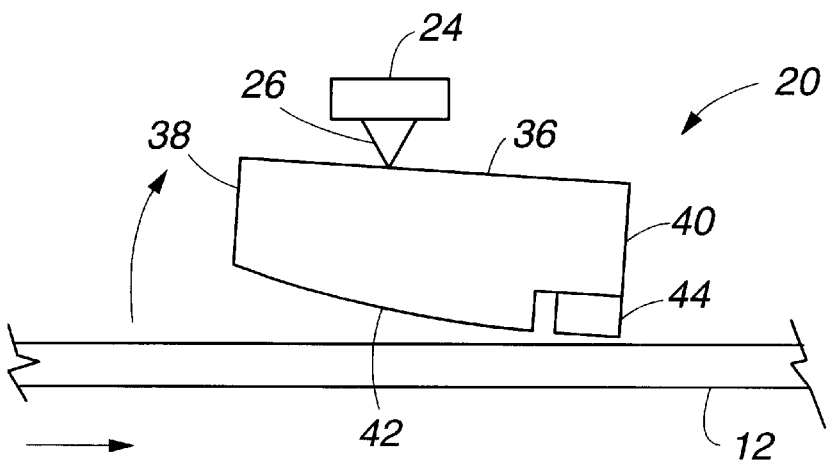
FIG. 3B illustrates the positional relationship of the slider shown in FIGS. 2A–2C to the disk at a time when the disk is rotating at an angular velocity suitable for data transfer operations.

FIG. 3A illustrates the positional attitude of the slider 20 when the disk 12 is spun down or at rest. In contrast, FIG. 3B illustrates the positional relationship of the slider 20 to the disk 12 when the disk is rotating at an angular velocity suitable for data transfer operations. In this case, the air bearing structure of the slider 20 functions to rotate the slider 20 so that the leading face 38 moves away from the disk 12 and the only portion of the slider 20 in contact with the disk 12 is the pad trailing edge 48. By positioning the slider 20 in this manner, the read/write head 18 is positioned extremely close to the disk 12, thereby permitting high data densities to be achieved.

Figure 4A:
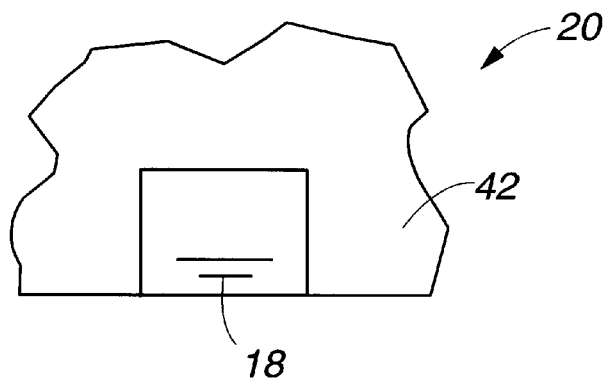
FIGS. 4A and 4B are bottom and side views illustrating the accumulation of debris on the pad of the slider illustrated in FIGS. 2A–2C that houses the head.
Figure 4B:
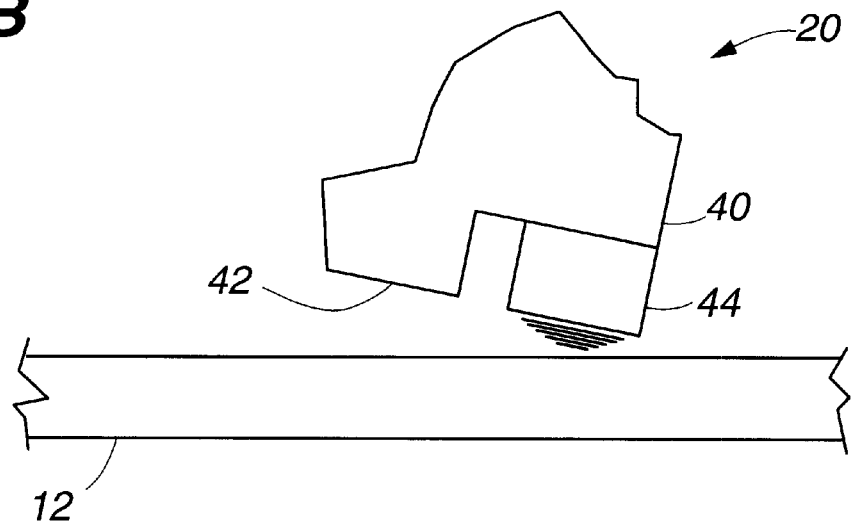

FIGS. 4A and 4B illustrate the problem addressed by the present invention. Specifically, the problem is the accumulation of debris on the pad that occurs during operation of the disk drive 10. The debris is primarily composed of the lubricant that forms the top surface of the disk 12 and other particles that are encountered by the pad 44 during rotation of the disk 12. As illustrated in FIG. 4B, the debris can accumulate to a point at which the read/write head housed within the slider 20 becomes spaced or separated from the disk 12 to an extent that data transfer operations are inhibited. To elaborate, the disk drive 10 is designed to operate with a specified data density on the disk 12. As the read/write head 18 is moved away from the disk 12, such operation becomes increasingly difficult and, after a certain point, virtually impossible. Further, if debris accumulates on the pad 44 and the pad is positioned over a single track or over a closely spaced number of tracks for a substantial period of time, the heat produced can polymerize the lubricant to create a varnish-like film that is very difficult to remove and if allowed to accumulate, can reach a point at which the disk drive is inoperable and can only be repaired by replacing the slider 20.

The present invention prevents the accumulation of debris on the pad and the formation of the varnish-like film by cleaning the pad prior to the times at which debris would accumulate to a point at which data transfer operations would be substantially inhibited. Specifically, the spin motor 14 is caused to rotate at an angular velocity that is less than the angular velocity at which data transfer operations occur and the actuator assembly 22 is used to radially displace the slider 20 over the disk to clean at least a portion of the pad 44. The reduced angular velocity of the disk is chosen so that for a particular radial location of the slider 20 over the disk, a portion of the pad 44 (which is crowned) contacts the disk 12. The radial displacement causes a different portion of the pad 44 to contact and be cleaned by the disk 12. To elaborate, for a constant angular velocity of the disk 12, the wind speed experienced by the slider 20 increases as the slider moves toward the outer edge of the disk 12. The air bearing structure of the slider 20 operates at lower wind velocities to position the slider more toward the orientation shown in FIG. 3A, and for higher wind velocities, more towards the position illustrated in FIG. 3B. Consequently, for a given angular velocity, a radial displacement of the slider 20 can be determined in which the entire pad disk surface 50 of the pad 44 is contacted and cleaned by the disk 12.

Figure 5:
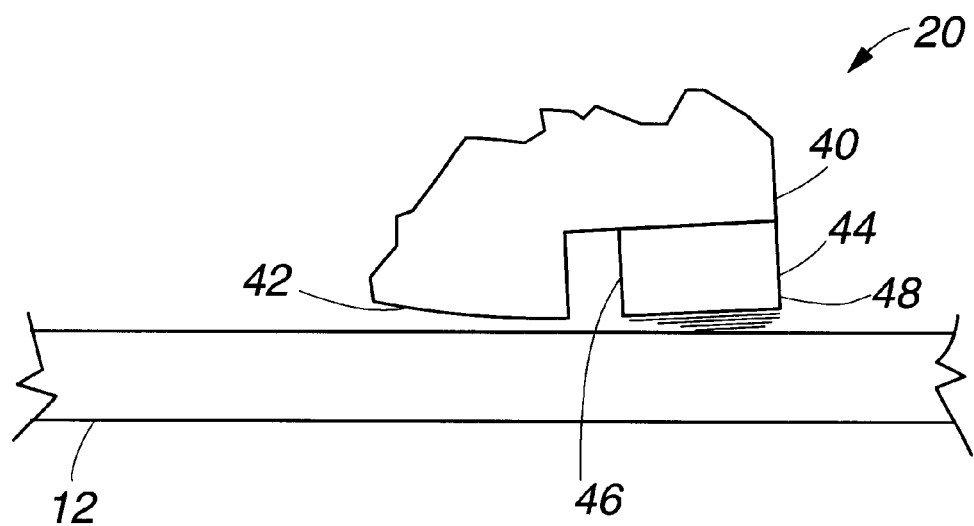
FIG. 5 illustrates the positional relationship of the slider shown in FIGS. 2A–2C to the disk when the disk is rotating at an angular velocity suitable for cleaning the slider.

In the preferred embodiment, a reduced angular velocity for the disk is chosen so that the entire pad disk surface 50 is cleaned by contact with the disk 12 during a radial displacement of the slider from the inner-most radius to the outer-most radius of the disk 12 that the actuator assembly 22 is capable of moving the slider 20. This not only serves to clean the pad disk surface 50 but also removes or sweeps particles residing on the surface of the disk 12 that, if allowed to remain, could contribute to the accumulation of debris on the pad 44. FIG. 5 illustrates the orientation of the slider 20 at the inner radius of the disk. At this 20 location, the portion of the pad disk surface 50 adjacent the pad leading edge 46 is contacted and cleaned by the disk. As the slider is displaced towards the outer radius of the disk, sections of the pad disk surface 50 located successively more towards the pad trailing edge 48 are contacted and cleaned by the disk. At the outer radius, the slider is positioned as shown in FIG. 3B. Further, by using the actuator assembly 22 to move the slider 20 towards the inner radius, the lubricant which forms the top surface of the disk 12 and has a tendency to migrate toward the outer diameter of the disk 12 can be redistributed. Moreover, by moving the slider 20 between the inner and outer radiuses one or more times, the lubricant can be evenly distributed over the entire range of motion.

The reduction of the angular velocity of the disk 12 and radial displacement of the slider 20 over the disk 12 to clean the pad disk surface 50 and the disk 12 can be implemented at a number of different times. Specifically, implementation can occur when the rotational velocity of the disk 12 is increasing, such as when the disk drive is transitioning from a first state to a second state that requires an increase in the rotational velocity of the disk 12. For example, the first state may be a cold, start-up state in which the disk is not rotating at all, or it may be a low-energy state in which the disk is being rotated at an angular velocity that is less than the angular velocity employed during normal data transfer operations. Another time that is suitable for the cleaning operation is when the disk drive is transitioning between states that result in a reduction of the angular velocity at which the disk 12 is rotated. For example, the disk drive 10 could be transitioning from a normal operational state at which the disk is rotated at a first angular velocity appropriate for data transfer operations to a reduced energy state or a cold, start-up state at which the disk 12 is rotated at a reduced angular velocity or is entirely stopped.

The cleaning operation can also be accomplished at times when the slider 20 is expected to have accumulated debris to an extent that data transfer operations may begin to be effected. For instance, the cleaning operation can be accomplished periodically when the disk drive 10 is being used over an extended period of time.

Additionally, the cleaning operation can be implemented based upon the prior use of the disk drive 10. For instance, it is believed that the noted varnish-like film forms when the slider 20 is positioned over a single track or a closely spaced group of tracks for an extended period of time so that heat is built up between the slider 20 and the disk 12 to an extent that the debris on the slider 20, which is largely comprised of lubricant, is polymerized to form the varnish-like film. In such a situation, the cleaning operation is implemented at times chosen so as to prevent the formation of the varnish-like film.

Another time at which the cleaning operation can be implemented is as part of an error recovery operation. More specifically, if the read/write channel 30 detects an error in a data transfer operation, part of the process for attempting to rectify the error includes implementation of the cleaning operation.

Generally, in one embodiment, implementation of the cleaning operation at the times noted hereinabove, is accomplished by the controller 32 communicating with the spin motor servo control 16 to reduce the angular velocity at which the spin motor 14 rotates the disk and to communicate with the actuator servo control 34 to radially displace the slider 20 over the disk 12. It should, however, be appreciated that implementation of the cleaning operation in certain instances may be accomplished in other ways. For example, in the case when the cleaning operation is associated with an error recovery operation, it is possible that the read/write channel 30 may communicate directly with the spin motor servo control 16 and actuator servo control 34 to initiate the cleaning operation.

In one embodiment, it is preferred to provide for a cleaning procedure without the need to rely on the spin motor servo control 16 or the actuator servo control 34. In this embodiment, the angular velocity desired for a cleaning procedure is substantially less than that at which a spin motor servo control is normally designed to operate.

Figure 6:
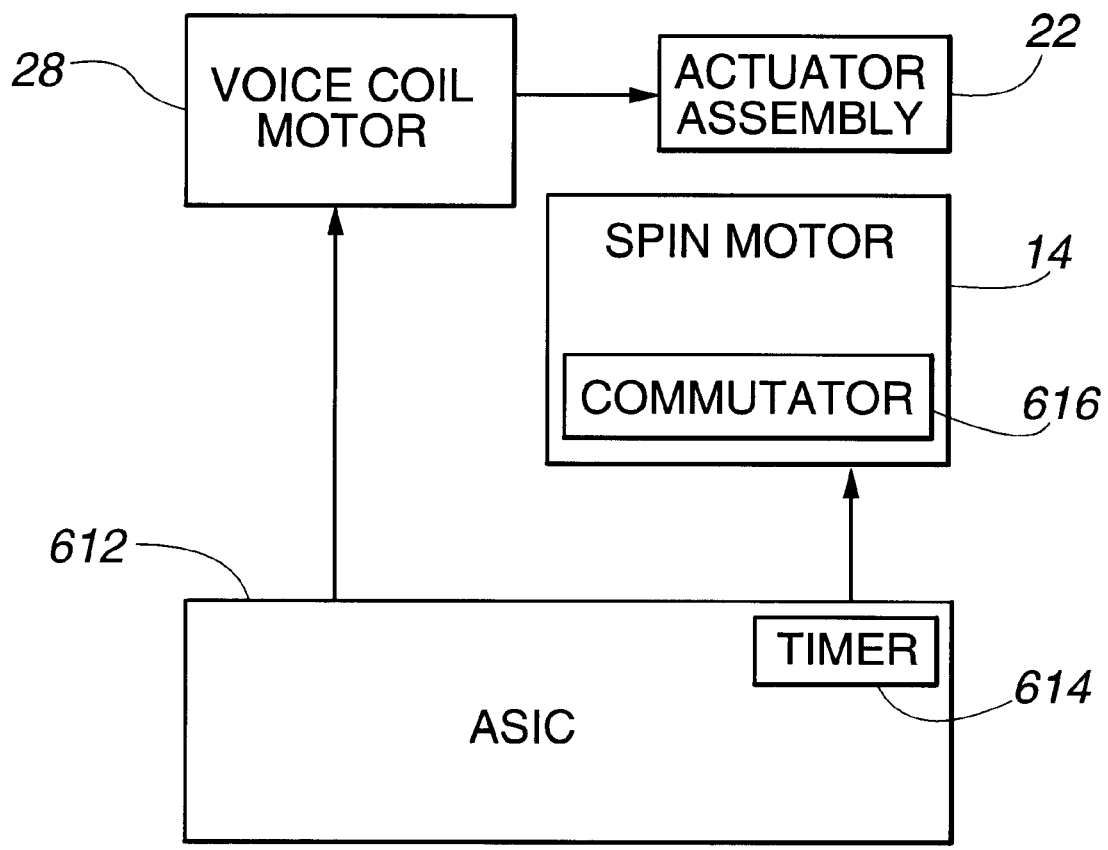
FIG. 6 is a block diagram showing items used during a cleaning procedure.

As seen in FIG. 6 during the cleaning procedure, the spin motor 14 and the voice coil motor 28 are driven using an open loop control system without the spin motor servo control 16 or actuator servo control 34. Instead, a control device such as an application-specific integrated circuit (ASIC) 612 provides predetermined values to be used in open loop control of spin motor 14 and voice coil motor 28. Thus, there is no need for a feedback loop or servo system during the cleaning procedure for either the spin motor 14 or the voice coil motor 28. Although these systems are provided for closed loop control during normal operation, they are not needed during this embodiment of the cleaning procedure.

It is believed the below-described open loop spin motor control and open loop voice coil motor control would typically not be suitable for use in previous designs of disk drives since non-servo or open loop control does not provide sufficient stability or precision for normal disk drive operations. In particular, when an open loop system is used to provide constant-interval commutation pulses to the spin motor 14, the pulses will eventually lose the desired synchronization with respect to the spin motor position (owing, e.g., to small imperfections and variations, environmental factors such as temperature changes, vibrations and the like) so that the commutation pulses will cease to provide the desired spin motor drive, in some cases eventually retarding motion of the spin motor rather than driving it. Nevertheless, the open loop system of the present invention can achieve the desired low-velocity spin since, partly owing to the rotational inertia of the system, there will typically be sufficient time to perform the cleaning procedure before loss of synchronicity of the constant-interval commutation pulses degrades the system to the point that spin required for the cleaning procedure is lost.

Since previous spin motor servo controls and actuator servo controls are typically configured to operate at substantially higher speeds, the present invention, by obviating the need for such servo controls during the cleaning procedure, permits implementation of the cleaning procedure without the need for redesigning a servo system and requiring only relatively minor changes, in some cases, substantially only software changes, in order to implement the cleaning procedure, thus achieving the desired cleaning function at relatively low cost.

Figure 7:
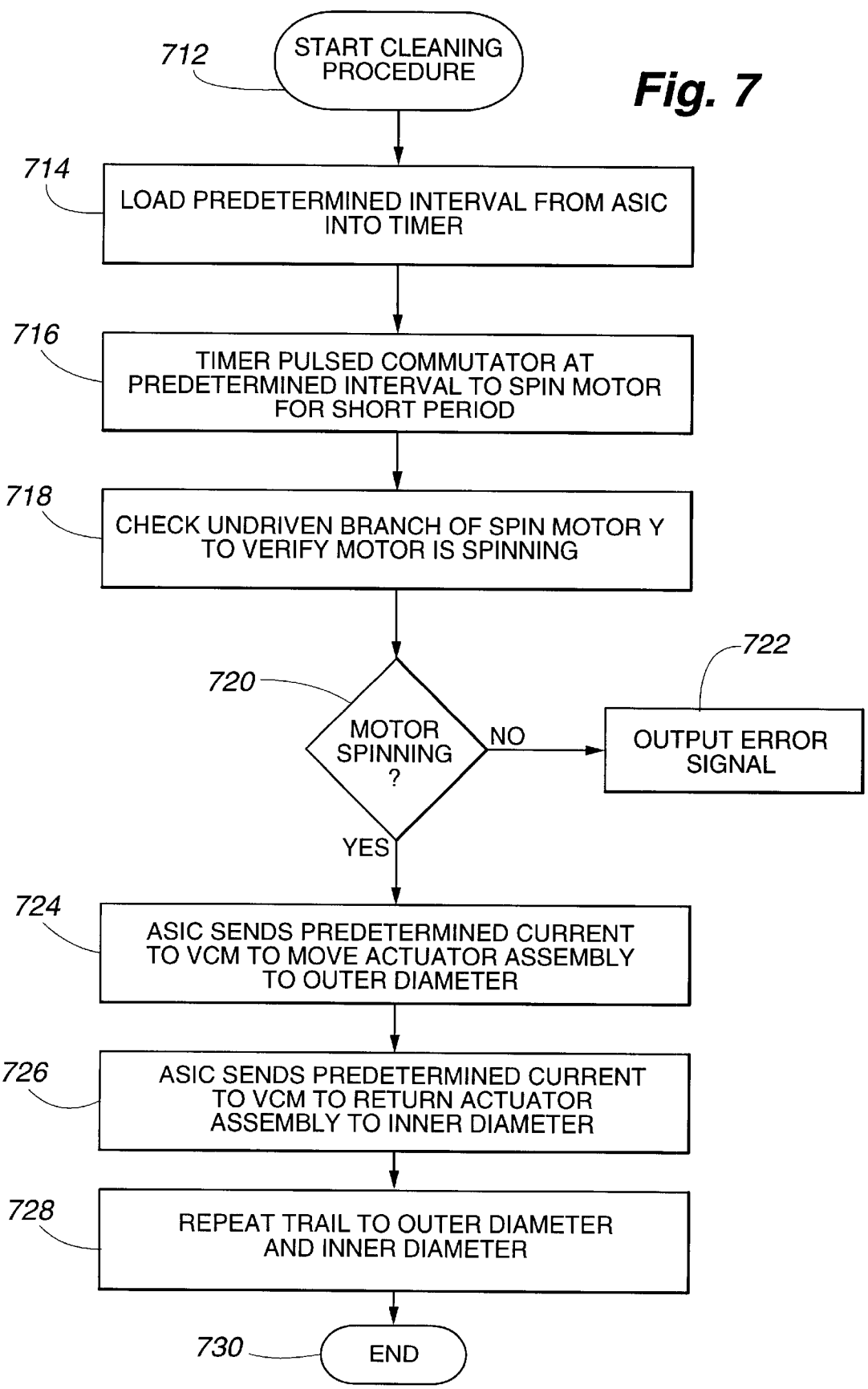
FIG. 7 is a flow chart of motor control during a cleaning period.

As depicted in FIG. 7, when a cleaning procedure is started (block 712), a timer 614 in the drive's ASIC 612 is loaded with a predetermined commutation interval (block 714). The timer 614 sends commutation pulses to the commutator 616 of the spin motor 14 at the predetermined interval in order to spin the spin motor 14, preferably for a relatively short period of time (such as about 1 to 2 seconds) needed for the cleaning procedure (block 716). Once the timer 614 begins sending commutation pulses, the undriven branch of the spin motor Y arm is monitored to verify that the spin motor is spinning, e.g., by verifying the presence of back-EMF zero crossings (block 718). The absence of such zero crossings is an indication that the spin motor 14 is not spinning (e.g. because of adhesion forces or so-called "stiction")(block 720). In this situation, the actuator assembly is not moved onto the read/write surface of the disk (since moving the actuator assembly against a static disk can cause damage) and an error signal is output (block 722). If it is determined that the disk is spinning (block 720), the ASIC 612 outputs a predetermined current to the voice coil motor 28. The open loop actuator control system works by applying a time-varying current to the actuator voice coil motor 28. The range of current variation is selected so that the actuator assembly will move across the full stroke. The current profile is selected to be relatively slow with respect to the dynamics of the actuator assembly. The value of the current may be selected empirically and preferably is sufficient to move the actuator assembly to the extreme outer diameter (OD) position or to a mechanical stop such as a "crash" stop (block 726). The ASIC 612 then changes the current provided to the voice coil motor 28 to a current appropriate for returning the actuator assembly to the inner diameter (ID), rest or "park" position (block 726). In the depicted embodiment, movement to the outer diameter and back to the inner diameter is repeated (block 728). For example, during the spin cleaning process, the motor is rotated at about 1000 RPM and the actuator assembly is swept across the disk 4 times in a period of about 1 second. After the cleaning procedure has been completed (block 730); the spin motor 14 is allowed to spin-up in the usual fashion.

The foregoing description of the invention has been presented for purposes of illustration and description. Further, the description is not intended to limit the inventions to the form disclosed herein. Consequently, variations and modifications commensurate with the above teachings, and the skill or knowledge in the relevant art are within the scope of the present invention. The preferred embodiments described hereinabove are further intended to explain the best mode known of practicing the invention and to enable others skilled in the art to utilize the invention in various embodiments and with the various modifications required by their particular applications or uses of the invention. It is intended that the appended claims be construed to include alternative embodiments to the extent permitted by the prior art.

What is claimed is:

1. A method for cleaning a slider of a proximity recording interface in a disk drive, said disk drive having an actuator assembly and a spin motor configured for rotation at a minimum normal speed during read/write operations, the method comprising:

rotating said spin motor at a cleaning speed, substantially less than said minimum normal speed; and moving said actuator assembly along a path having a radial component, while said spin motor is spinning at said cleaning speed, wherein a contact pad surface of said interface successively contacts a disk of said disk drive adjacent to a leading edge of said contact pad and a trailing edge of said contact pad.

2. A method as claimed in claim 1, further comprising:

pulsing a commutator of said spin motor at a substantially constant pulse rate interval to provide said cleaning speed, in the absence of a feedback loop, using open loop control during said cleaning; and servo-controlling said spin motor to provide said minimum normal speed using closed loop control during said read/write operations.

3. A method as claimed in claim 2, wherein said cleaning speed is about 1000 RPM.

4. A method as claimed in claim 1, further an comprising:

providing a voice coil motor for moving said actuator assembly;

applying a predetermined time-varying current to said voice coil motor, in the absence of a feedback loop, using open loop control during said cleaning; and servo-controlling said voice coil motor using closed loop control during said read/write operations.

5. A method as claimed in claim 4, wherein said time varying current moves said actuator assembly through a full range of motion from an inner diameter of said disk to an outer diameter of said disk.

6. A method as claimed in claim 1, wherein said actuator assembly is moved during said cleaning using open loop control, and said actuator assembly is moved during said read/write operations using closed loop control.

7. A method as claimed in claim 6, wherein said actuator assembly is moved during said cleaning for about 1 to 2 seconds.

8. A method as claimed in claim 1, wherein said spin motor is rotated at said cleaning speed using an open loop control system, and said spin motor is rotated at said minimum normal speed using a closed loop control system.

9. A method as claimed in claim 8, wherein said closed loop control system includes a spin motor servo control unit.

10. A method as claimed in claim 9, wherein said open loop control system excludes said spin motor servo control unit.

11. A method for cleaning a slider in a disk drive, comprising:

rotating a disk at a first angular velocity during read and write operations; and rotating said disk at a second angular velocity, lower than said first angular velocity, during a cleaning operation in which said slider contacts said disk as said slider is radially displaced over said disk in order to remove debris from said slider.

12. A method as claimed in claim 11, wherein said slider is radially displaced between an inner radius and an outer radius of said disk.

13. A method as claimed in claim 12, wherein said slider is radially displaced from said inner radius to said outer radius.

14. A method as claimed in claim 12, wherein said slider is radially displaced from said outer radius to said inner radius.

15. A method as claimed in claim 12, wherein said slider is radially displaced from said inner radius to said outer radius and from said outer radius to said inner radius.

16. A method as claimed in claim 12, wherein said slider is radially displaced from said inner radius to said outer radius and from said outer radius to said inner radius at least two times.

17. A method as claimed in claim 11, wherein said slider is radially displaced to redistribute lubricant on said disk that migrates towards an outer diameter of said disk.

18. A method as claimed in claim 17, wherein said lubricant facilitates movement of said slider over said disk during said read and write operations.

19. A method as claimed in claim 17, wherein said debris is largely comprised of said lubricant.

20. A method as claimed in claim 17, wherein said debris includes a varnish-like film caused by polymerizing said lubricant.

21. A method as claimed in claim 11, wherein said second angular velocity occurs as said disk drive transitions from a start-up state in which said disk is motionless to an operational state for said read and write operations.

22. A method as claimed in claim 11, wherein said second angular velocity occurs as said disk drive transitions from an operational state for said read and write operations to a start-up state in which said disk is motionless.

23. A method as claimed in claim 11, wherein said second angular velocity occurs as said disk drive transitions from an energy saving state in which said disk is rotating to an operational state for said read and write operations.

24. A method as claimed in claim 11, wherein said second angular velocity occurs as said disk drive transitions from an operation state for said read and write operations to an energy saving state in which said disk is rotating.

25. A method as claimed in claim 11, wherein said cleaning operation occurs when said disk drive is expected to have accumulated said debris to an extent that said read and write operations may be effected.

26. A method as claimed in claim 11, wherein said cleaning operation occurs periodically.

27. A method as claimed in claim 11, wherein said cleaning operation occurs in response to prior use of said disk drive.

28. A method as claimed in claim 27, wherein said prior use is positioning said slider over a single track of said disk for an extended period of time.

29. A method as claimed in claim 27, wherein said prior use is positioning said slider over a closely spaced group of tracks on said disk for an extended period of time.

30. A method as claimed in claim 11, wherein said cleaning operation is implemented as part of an error recovery operation.

31. A method as claimed in claim 30, wherein said error recovery operation occurs during said read operation.

32. A method as claimed in claim 30, wherein said error recovery operation occurs during said write operation.

33. A method as claimed in claim 30, wherein said error recovery operation occurs during a failed data transfer operation.

34. A method as claimed in claim 33, wherein said error recovery operation implements said cleaning operation before said failed data transfer operation is retried.

35. A method as claimed in claim 11, wherein said slider continually contacts said disk as said slider is radially displaced over said disk during said cleaning operation.

36. A method as claimed in claim 11, wherein said slider and said disk provide a proximity recording interface during said read and write operations.

37. A method as claimed in claim 11, wherein said slider includes a pad that houses a head for transferring data to and from said disk during said read and write operations.

38. A method as claimed in claim 37, wherein said pad includes a leading edge and a trailing edge, and said cleaning operation includes radially displacing said pad between a first radial position over said disk and a second radial position over said disk, wherein said leading edge contacts said disk in said first radial position but not in said second radial position, and said trailing edge contacts said disk in said second radial position but not in said first radial position.

39. A method as claimed in claim 38, wherein said head is disposed proximate to said trailing edge.

40. A method as claimed in claim 38, wherein a proximity recording interface between said slider and said disk during said read and write operations is provided by substantially only said trailing edge and said disk.

41. A method for cleaning a slider in a disk drive, comprising:
 providing a slider that includes a pad, wherein said pad includes a leading edge and a trailing edge, and said pad houses a head for transferring data to and from a disk during read and write operations;
 rotating said disk at a first angular velocity during said read and write operations; and
 rotating said disk at a second angular velocity, lower than said first angular velocity, during a cleaning operation in which said pad contacts said disk in order to remove debris from said pad, wherein said cleaning operation includes radially displacing said pad between a first radial position over said disk and a second radial position over said disk, said leading edge contacts said disk in said first radial position but not in said second radial position, and said trailing edge contacts said disk in said second radial position but not in said first radial position.

42. A method as claimed in claim 41, wherein said radial displacement is at least a width of said pad.

43. A method as claimed in claim 41, wherein said first radial position is an inner radius of said disk and said second radial position is an outer radius of said disk.

44. A method as claimed in claim 41, wherein said head is disposed proximate to said trailing edge.

45. A method as claimed in claim 41, wherein said pad includes a convex surface between said leading and trailing edges that faces said disk.

46. A method as claimed in claim 45, wherein substantially all of said convex surface contacts said disk during said cleaning operation.

47. A method as claimed in claim 41, wherein said slider includes an air bearing surface facing said disk that moves said trailing edge towards said disk and said leading edge away from said disk as said slider moves from said first radial position to said second radial position while said disk rotates at said second angular velocity, and moves said leading edge towards said disk and said trailing edge away from said disk as said slider moves from said second radial position to said first radial position while said disk rotates at said second angular velocity.

48. A method as claimed in claim 41, wherein said slider contacts said disk during said read and write operations.

49. A method as claimed in claim 48, wherein said slider contacts said disk during said read and write operations by a proximity recording interface between said pad and said disk.

50. A method as claimed in claim 49, wherein said proximity recording interface is provided by substantially only said trailing edge and said disk.

51. A method for cleaning a slider in a disk drive, comprising:
 providing a slider that includes a pad, wherein said pad includes a leading edge, a trailing edge, and a convex surface between said leading and trailing edges that faces a disk, said pad houses a head in close proximity to said trailing edge, and said head transfers data to and from said disk during read and write operations;
 rotating said disk at a first angular velocity during said read and write operations; and
 rotating said disk at a second angular velocity, lower than said first angular velocity, during a cleaning operation in which said pad contacts said disk in order to remove debris from said pad, wherein said cleaning operation includes radially displacing said pad between a first radial position over said disk and a second radial position over said disk, said leading edge contacts said disk in said first radial position but not in said second radial position, said trailing edge contacts said disk in said second radial position but not in said first radial position, and substantially all of said convex surface contacts said disk during said cleaning operation.

52. A method as claimed in claim 51, wherein said radial displacement is at least a width of said pad.

53. A method as claimed in claim 51, wherein said first radial position is an inner radius of said disk and said second radial position is an outer radius of said disk.

54. A method as claimed in claim 51, wherein said slider includes an air bearing surface facing said disk that moves said trailing edge towards said disk and said leading edge away from said disk as said slider moves from said first radial position to said second radial position while said disk rotates at said second angular velocity, and moves said leading edge towards said disk and said trailing edge away from said disk as said slider moves from said second radial position to said first radial position while said disk rotates at said second angular velocity.

55. A method as claimed in claim 51, wherein said slider and said disk provide a proximity recording interface during said read and write operations, and said proximity recording interface is provided by substantially only said trailing edge and said disk.

56. A method as claimed in claim 51, wherein said second angular velocity occurs as said disk drive transitions from a start-up state in which said disk is motionless to an operational state for said read and write operations.

57. A method as claimed in claim 51, wherein said second angular velocity occurs as said disk drive transitions from an operational state for said read and write operations to a start-up state in which said disk is motionless.

58. A method as claimed in claim 51, wherein said second angular velocity occurs as said disk drive transitions from an energy saving state in which said disk is rotating to an operational state for said read and write operations.

59. A method as claimed in claim 51, wherein said second angular velocity occurs as said disk drive transitions from an operation state for said read and write operations to an energy saving state in which said disk is rotating.

60. A method as claimed in claim 51, wherein said cleaning operation occurs when said disk drive is expected to have accumulated said debris to an extent that said read and write operations may be effected.

61. A method as claimed in claim 51, wherein said cleaning operation occurs periodically.

62. A method as claimed in claim 51, wherein said cleaning operation occurs in response to prior use of said disk drive.

63. A method as claimed in claim 62, wherein said prior use is positioning said slider over a single track of said disk for an extended period of time.

64. A method as claimed in claim 62, wherein said prior use is positioning said slider over a closely spaced group of tracks on said disk for an extended period of time.

65. A method as claimed in claim 51, wherein said cleaning operation is implemented as part of an error recovery operation.

66. A method as claimed in claim 65, wherein said error recovery operation occurs during said read operation.

67. A method as claimed in claim 65, wherein said error recovery operation occurs during said write operation.

68. A method as claimed in claim 65, wherein said error recovery operation occurs during a failed data transfer operation.

69. A method as claimed in claim 68, wherein said error recovery operation implements said cleaning operation before said failed data transfer operation is retried.

70. A method as claimed in claim 69, wherein said failed data transfer operation is one of said read and write operations.

* * * * *